United States Patent [19]

Lerman

[11] Patent Number: 4,628,574
[45] Date of Patent: Dec. 16, 1986

[54] METHOD FOR CONSTRUCTING AN IMPELLER ASSEMBLY AND SHAFT HAVING INTERFERENCE FIT

[75] Inventor: Michael J. Lerman, Edison, N.J.

[73] Assignee: De Dietrich (USA), Inc., Union, N.J.

[21] Appl. No.: 608,630

[22] Filed: May 9, 1984

Related U.S. Application Data

[62] Division of Ser. No. 534,657, Sep. 22, 1983, abandoned.

[51] Int. Cl.$^4$ .................. B23P 15/04; B23P 19/02; B23Q 3/00
[52] U.S. Cl. ................... 29/156.8 R; 29/467; 29/525; 403/334; 403/345; 416/244 R
[58] Field of Search ............ 29/156.8 R, 447, 467, 29/525, 252, 458; 403/333, 334, 345, 273; 416/244 R

[56] References Cited

U.S. PATENT DOCUMENTS

| | | | |
|---|---|---|---|
| 648,352 | 4/1900 | Blanton, Jr. | 403/333 |
| 2,147,343 | 2/1939 | Hokanson | 29/525 X |
| 2,464,908 | 3/1949 | Volkmann | 29/525 X |
| 2,811,339 | 10/1957 | Osborne et al. | 416/200 R |
| 3,019,039 | 1/1962 | Clavell | 403/273 X |
| 3,175,808 | 3/1965 | Dedoes | 366/605 X |
| 3,466,066 | 9/1969 | Dawson | 29/525 X |
| 3,494,642 | 2/1970 | Coberly et al. | 403/273 X |
| 3,494,708 | 2/1970 | Nunlist et al. | 416/214 R |
| 3,508,773 | 4/1970 | Coberly et al. | 29/525 |
| 3,526,467 | 9/1970 | Kime | 416/200 R |
| 3,920,227 | 11/1975 | Davis, Jr. | 366/330 X |
| 4,221,488 | 9/1980 | Nunlist et al. | 366/343 |
| 4,314,396 | 2/1982 | Nunlist et al. | 29/156.8 R |

FOREIGN PATENT DOCUMENTS 2734747 2/1979 Fed. Rep. of Germany ...... 403/273

OTHER PUBLICATIONS

Machinery's Handbook, 19th Edition, Industrial Press, pp. 1506-1531, Erick Oberg and Franklin D. Jones, 1973.

*Primary Examiner*—Howard N. Goldberg
*Assistant Examiner*—Ronald S. Wallace
*Attorney, Agent, or Firm*—Pennie & Edmonds

[57] ABSTRACT

A shaft and an impeller assembly are connected together in an interference fitted connection. Both the shaft and impeller assembly are coated with a corrosion resistant material and the connection is created between the coated surfaces at a region of complementary tapers.

1 Claim, 9 Drawing Figures

METHOD FOR CONSTRUCTING AN IMPELLER ASSEMBLY AND SHAFT HAVING INTERFERENCE FIT

REFERENCE TO RELATED APPLICATION

This application is a division of application Ser. No. 534,657, filed Sept. 22, 1983, which has now become abandoned.

DESCRIPTION

1. Technical Field

The invention relates to an impeller assembly mounted and retained on a shaft by an interference fit. The impeller assembly and shaft are adapted to be assembled within a vessel, and both the impeller assembly and the length of shaft within the vessel are coated with a material inert to the materials which may be reacted within the vessel. The coating is applied to the entire surface of each component and the interference fit is obtained between coated surfaces.

2. Background Art

An impeller assembly for mounting on a shaft, and having use in conjunction with a vessel for mixing reactants is known to the prior art. It is also known to coat the substructure of the impeller assembly and shaft which will be in contact with the material, with an inert coating material, such as a vitreous enamel or glass, for example, thereby to protect the substructure from damage through corrosive or other damaging action caused by the reactants. Further, it is known that the impeller assembly and shaft may be mounted together within the vessel and retained in a mounted orientation by an interference fit developing a sufficient measure of force to permit transmission of a driving torque to the impeller assembly.

Typical of the prior art of this type are U.S. Pat. Nos. 2,811,339 to A. V. Osborne et al, 3,494,708 to E. J. Nunlist et al and 4,221,488 to E. J. Nunlist et al.

Osborne et al and Nunlist et al, referring to both patents, disclose structures that are coated with a coating either of vitreous enamel or glass for purposes of protection of the substructure from attack through contact with corrosive materials or other materials within the vessel which may deleteriously attack that substructure. The Osborne et al patent and the first-mentioned Nunlist et al patent, describe a manner and means which may generally be considered as a mechanical compression fit in mounting the impeller assembly on the shaft. These patents, and U.S. Pat. No. 3,526,467 to D. L. Kime, also, disclose the impeller assembly as comprising a tier of hub structures, with each hub structure carrying at least one outward extending blade. In Osborne et al, and in the first-mentioned Nunlist et al patent, one hub structure carries a pair of blades, while the other hub structure carries a single blade. The Kime hub structures each carry a pair of blades. The blades of these patents are illustrated as having their tips generally in a curved configuration (both Osborne et al and Nunlist et al), and Kime illustrates the blades of each hub structure to be offset toward the other hub structure so that the tips of the blades generally follow a common circular path. In each patent, the blades extend at equiangular positions from the hub structures.

The second-mentioned Nunlist et al patent, on the other hand, describes that the structures may be mounted in an interference fit. Particularly, this Nunlist et al patent describes an interference fit which is created by first contracting the shaft by contact with a cryogenic coolant, and then, allowing the shaft to expand within a bore of a hub of the impeller assembly as the shaft temperature returns to the ambient condition. The impeller assembly includes a unitary hub structure having a plurality of four blades which extend outwardly in two pairs of spaced (radially) blades.

The second-mentioned Nunlist et al patent, described as an improvement over Osborne et al and the other Nunlist et al patent, is considered to suffer from certain disadvantages. Foremost of the disadvantages resides in the manner by which the interference fit between the impeller assembly and its supporting shaft is created. To this end, it is necessary to store the cryogenic material, not to mention the requirement of a capability both to handle and/or move the cryogenic material to a position at which it is used—in this instance into the interior of a shaft at its closed end—with their attendant problems and difficulties. Other problems may develop in mounting the impeller assembly on the shaft and releasing the impeller assembly from the shaft, particularly when it is considered that these operations are carried out within the vessel itself.

SUMMARY OF THE INVENTION

The invention is considered an improvement over Nunlist et al U.S. Pat. No. 4,221,488 at least in the manner of mounting an impeller assembly on a shaft, and the manner of creation of an interference fit for retaining the mounted orientation of the components. Further, the invention is considered to improve upon that prior art teaching in the capability of mounting more than a single impeller assembly on a shaft and retaining the impeller assembly of each tier on the shaft by an interference fit. Other areas of improvement over the prior art will be explored and will become evident as the description continues.

Several forms of an impeller assembly and shaft will be discussed. In each form, the impeller assembly and shaft are completely coated with a coating of an inert material to protect the substructure from possible deleterious contact with reactants in the vessel. Thus, each form of impeller assembly, whether it is mounted on the shaft as a single tier or as one tier of a plurality of tiers of impeller assemblies, is retained on the shaft by an interference fit created between the coated surfaces. The accurate surfacing of these critical tapered areas may be accomplished by any suitable means, such as grinding, honing or lapping. According to the invention, a pulling force exerted on the impeller assembly will result in relative movement between the impeller assembly and shaft to create an interference fit therebetween. The interference fit is capable of transmitting the required torque from the shaft to the impeller assembly without slippage between the mating components. This manner of creating an interference fit is considered to overcome those problems and difficulties attendant to the storage and handling of a cryogenic material, and it permits the creation of an interference fit without the necessity of means of access for the cryogenic material to the interior of the shaft. Further, a pushing force exerted on the impeller assembly will result in a positive release of components from the position at which they were in interference fit. In Nunlist et al '488, cryogenic material must be used to release the impeller assembly from the shaft. To this end, the cryogenic material is used to shrink the shaft. Oftentimes, however, heat transfer between the shaft and the impeller assembly is rapid so that as the shaft shrinks, there is a following shrinkage of the size of the bore in the hub of the impeller assembly. If this occurs, the components will not reiease.

In one form of the invention, the impeller assembly comprises a unitary construction including a hub, a plurality of blades extending from the hub in a direction along a radius of the axis of the impeller assembly, and a stub shaft extending from the hub in the axial direction. The shaft includes a socket at one end and both the socket and stub shaft are tapered at an angle of taper to form a self-locking interference fit.

In a second form of the invention, one or more impeller assemblies, comprising individual spaced tiers, are mounted on a shaft and pulled into an interference fit. Each impeller assembly in each tier may include one or more hubs, with each hub including a central bore and at least one blade. The shaft will include a region for each tier of impeller assemblies and both the region and bores of the hubs are tapered for reasons previously discussed. In a more specific form of the invention, each hub supports a pair of blades, and all of the blades are disposed in a position so that their tips describe substantially a single circular path. Further, the blades are arranged at equicircumferential attitudes for dynamic stability of the impeller assembly in rotation.

This form of the invention may be appreciated as improving upon the prior art for the further reason that two or more tiers of impeller assemblies may be mounted on a single shaft.

BEST MODE FOR CARRYING OUT THE INVENTION

Figure 1:
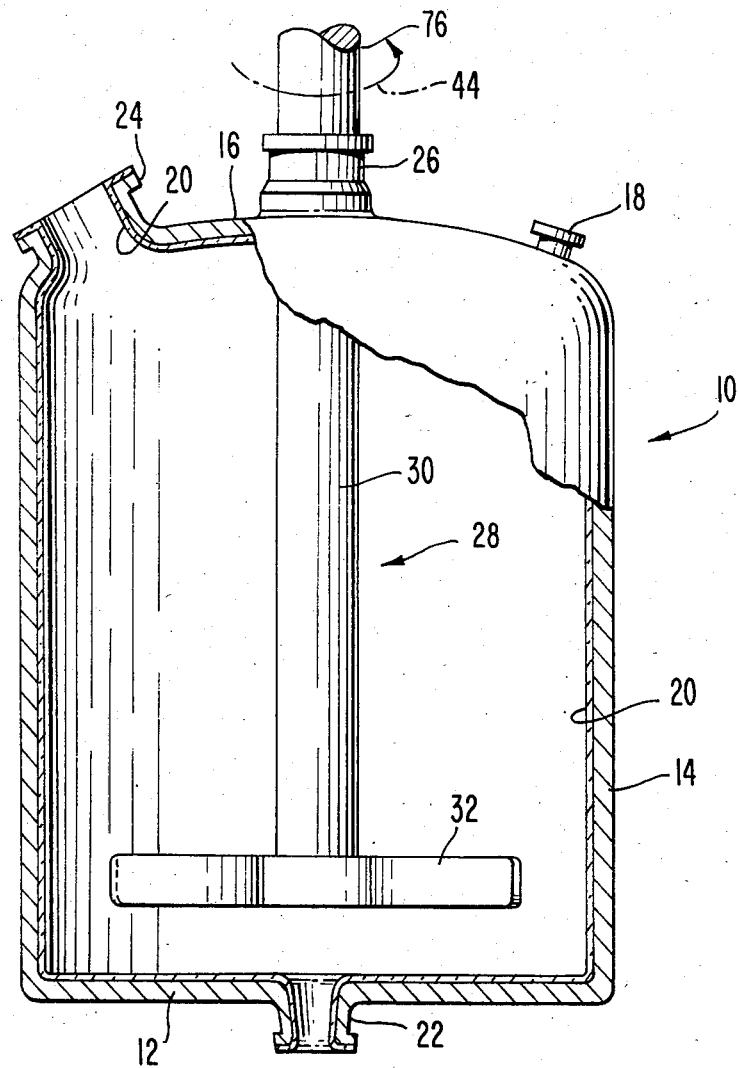
FIG. 1 is a view in elevation, partly broken away and partly in section, of a vessel with an impeller assembly and a shaft.

Referring to FIG. 1, a vessel 10 which may be a reactor of the type used in the chemical industry is illustrated schematically for the purpose of providing an environmental showing of the invention. These vessels oftentimes are quite large, and during processing of material it is not an uncommon occurrence that high pressures or vacuum develop within the confines of the vessel itself. Vessels of the type described above may be formed generally by a base 12, a wall 14 which extends from the base toward a top 16 which encloses the vessel.

The nature of the use of vessel 10 requires a coating for the surfaces of the substructure of the base, wall and top toward the interior of the vessel. The coating 20 preferably is in the form of a continuous layer of a material inert to the materials which may be subject to processing within the vessel. Typical coating materials are vitreous enamel and glass. By providing a continuous coating, for example, a coating of glass, these processed materials or their reaction products normally will be incapable of attacking the substructure of the vessel itself. This substructure, then, may be formed of substantially any material which shall display the necessary strength and operative specifications for use as a vessel. The glass layer may be in the range of thickness of about 0.030 to 0.100 in.

Since the vessel oftentimes is subject to conditions of pressure it has been found desirable to limit the number of openings into the interior of the vessel. To this end, a port 22 may be located in the base 12, and openings in top 16 preferably are limited to a manway 24 and a plurality of nozzles 18. The nozzles compared to the manway are relatively small and provide access to the vessel for the introduction of process streams. An opening 26 is located axially of the vessel and allows passage of the shaft of the apparatus used in stirring, agitating or otherwise processing the material. Structure (not shown) for supporting the shaft is mounted on top 16 above opening 26 and structure (also not shown) in the form of a shaft closure provides a seal within the annular opening between the shaft and opening 26. A cover (not shown) will close the manway.

Separable bladed agitators are particularly useful in vessels such as the type of vessel described because they permit the elimination of a large opening which is usually provided for the installation and removal of agitators of one-piece construction.

The apparatus for use in stirring, agitating or otherwise processing material may be characterized as a separable blade agitator 28 including a shaft 30 and an impeller assembly 32 carried by the shaft. These components of the separable blade assembly are illustrated only generally in FIG. 1.

Figure 2:
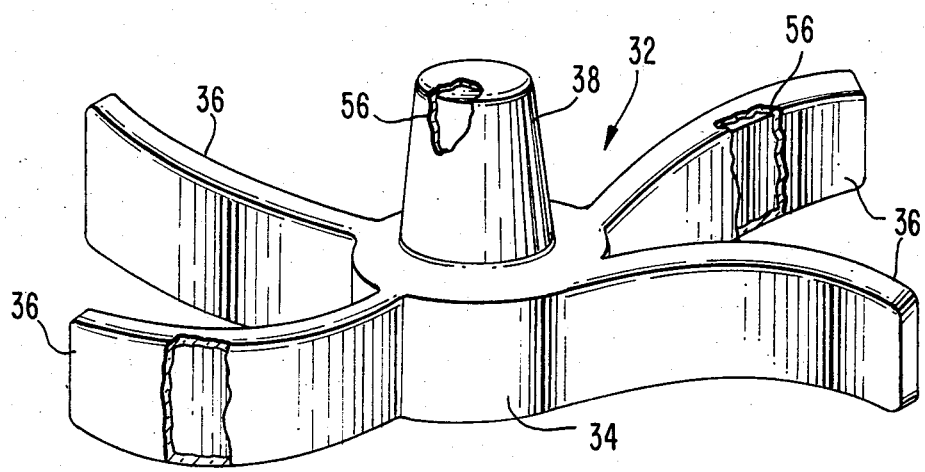
FIG. 2 is a perspective view of an impeller assembly.
Figure 3:
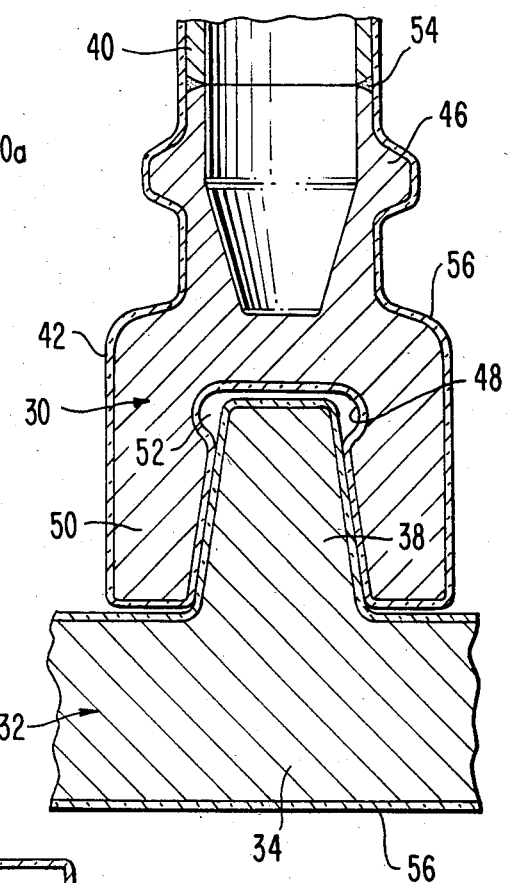
FIG. 3 is a partial view in elevation of the shaft and impeller assembly somewhat enlarged from the illustration of FIG. 1.

Referring to FIGS. 2 and 3, impeller assembly 32 includes a hub 34, a plurality of blades 36 and a stub shaft 38. The shaft 30 includes a pair of members 40, 42 which are connected together axially to provide a shaft of an extended length. Preferably, the shaft will be of a length to locate the impeller assembly mounted at its end near base 12, while extending from the opening 26.

The blades 36 extend outwardly of hub 34 in opposite paired dispositions of blades with the blades of each pair of blades being separated by an angle of about 45° to 75°, and a leading blade of one pair of blades being separated by an angle of about 105° to 135° from a trailing blade of the other pair of blades. The blades, as illustrated, may follow a somewhat arcuate outline from the region at hub 34 to the tips. The blades, also, may extend substantially radially.

The member 40 is the upper of the two members and connected to member 42 within the region for mounting the impeller assembly 32. The member 40, more specifically, is supported in a journal (not shown) above opening 26. A prime mover (not shown) is connected to member 40 of the shaft to drive the shaft in one direction of rotation or the other. Rotation of the shaft is represented by arrow 44. The upper member 40 may be formed by a cylinder, or the member may take the form of a rod. The particular form of the upper member is not important. However, from the standpoint of weight of the shaft it may be preferable to form the upper member as a cylinder. The lower member is of complex outline including a ridge 46, or a corresponding positioned groove, which completely circumscribes the lower member and a socket 48 at its end. The socket is formed by an annular well 50. As may be seen in FIG. 3, the inner wall of the socket is tapered from the end toward the axis of shaft 30. The socket, at its inner extreme, includes a ring 52 of somewhat bulbous configuration. A similar ridge may be provided on shaft 30a (see FIG. 4).

A weld 54 is illustrated as providing a permanent connection of the upper and lower member 40, 42 respectively. Other means of connecting structure may be resorted to.

In the form of the invention illustrated in FIGS. 2 and 3, both the shaft 30 and impeller assembly 32 are integral units (the impeller assembly may be integrated from the several components by weldments in a manner similar to the manner of formation of the shaft) comprising a metal substructure and a coating 56. The coating which covers the entire surface area of each component forming a composite may be of vitreous enamel or glass. The coating will be applied for purposes as heretofore discussed, and the coating material may be the same as the material used to coat vessel 10.

Figure 4:
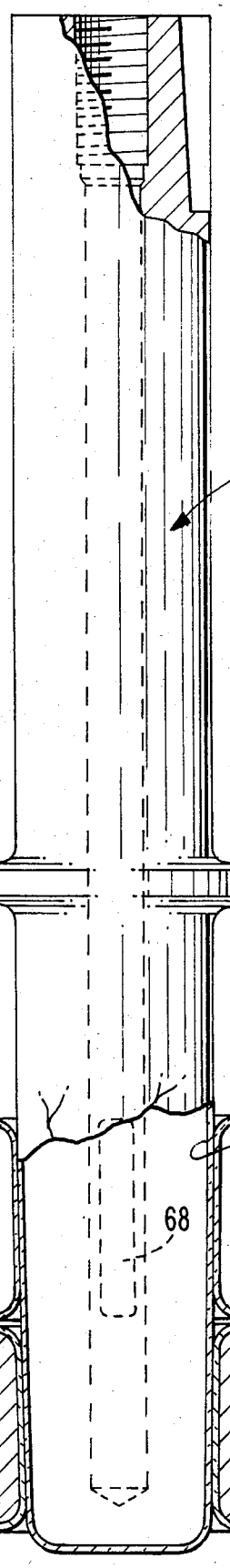
FIG. 4 is a view in elevation, on a scale similar to the scale of FIG. 3, of a shaft and impeller assembly comprising a second form of the invention.

FIG. 4 illustrates a second form of the apparatus of the invention. In this form of the invention, the shaft 30a includes an elongated member having a length substantially equal to the length of shaft 30. Thus, one end of the shaft resides within opening 26 while the other end extends toward base 12 thereby to support the impeller assembly 32a adjacent the base.

Shaft 30a includes at least one region 58 for mounting an impeller assembly 32a. In this form of the invention, the impeller assembly includes a pair of hubs 60, 62, each in the form of an annular body, with each hub supporting a pair of blades. To this end, hub 60 supports the blades 64, 66, and hub 62 supports a blade 68 and a second blade (not shown). The blades on hubs 60, 62 each extends in opposite directions and the hubs are received on the shaft so that the blades, as may be seen in FIG. 8, extend from the axis of the hub outwardly at 90° locations. The second blade, that is, the blade 70 may be seen in both FIGS. 7 and 8.

Figure 5:
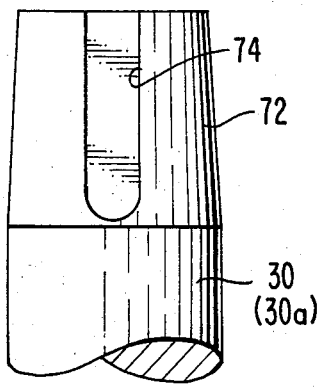
FIG. 5 is a partial view in elevation of an end of the shaft in FIG. 4.
Figure 6:
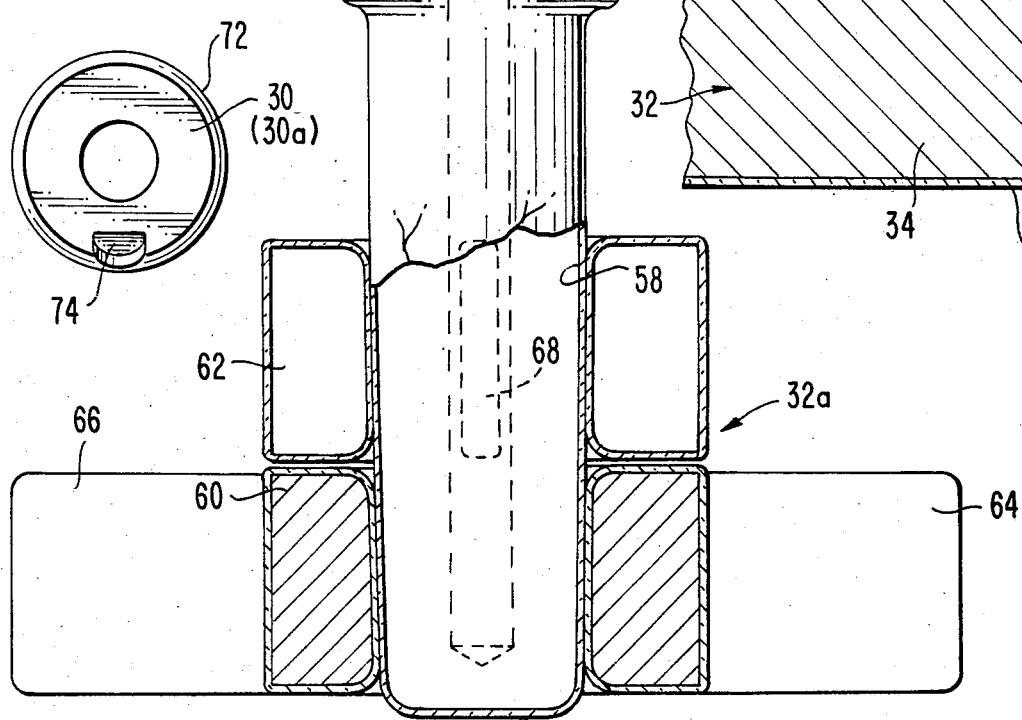
FIG. 6 is a plan view of the end of the shaft of FIG. 5.

FIGS. 5 and 6 illustrate a form of connection of a prime mover to drive shaft 30, 30a in rotation. To this end, the shafts may include a taper 72 along a short length and a slot 74 along substantially the length of the taper. The output of the prime mover, in turn, may comprise a collar 76 (see FIG. 1). The collar is adapted for receipt around the tapered shaft and may include a key or rib (not shown) to be received in the slot. Other mechanical means of securement of the parts may be resorted to, as well.

Figure 7:
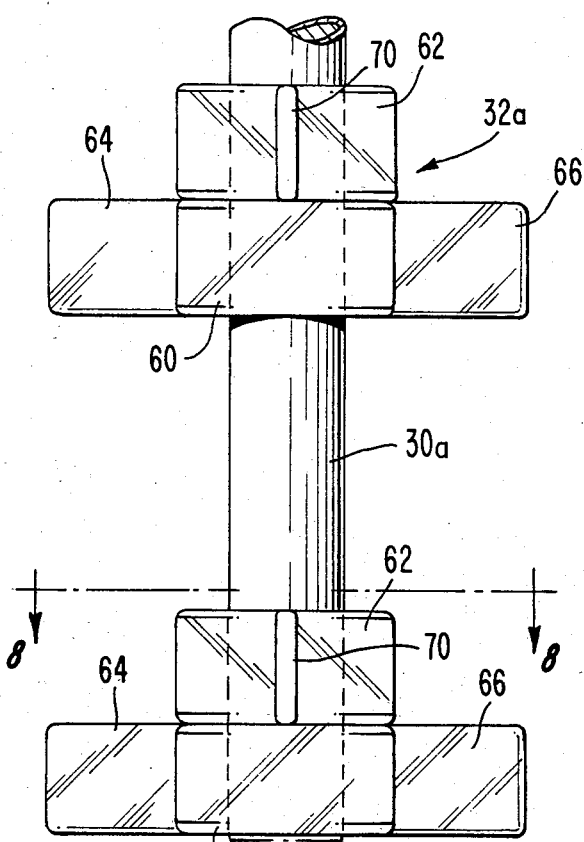
FIG. 7 is a partial view of the shaft of the second form of the invention and a pair of tiers of impeller assemblies.
Figure 8:
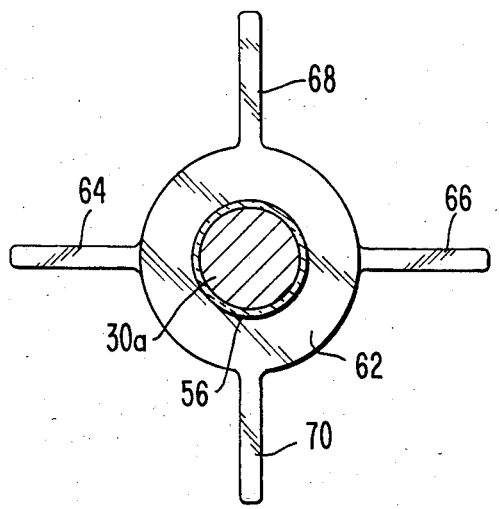
FIG. 8 is a view in section along the line 8-8 in FIG. 7.

Referring to FIG. 7, shaft 30a may include two or more regions 58 at spaced locations along the shaft to support separate tiers of impeller assemblies. While the impeller assemblies are illustrated to include two hubs with each hub including two oppositely extending blades, it is envisioned that each impeller assembly, equally as well, could include three and possibly four or more hubs to provide an array of blades in plan view which extend from the hubs at equicircumferential radial locations of less than 90°.

Shaft 30a, if it is to mount a plurality of tiers of impeller assemblies, will provide regions 58 of different diameter to receive the hubs of the impeller assemblies, which likewise are provided with bores of different diameter.

The blades in each tier of blades may extend from the supporting hub in a number of different attitudes. To this end, referring to FIGS. 4 and 7, the blades may each extend radially outwardly of the hub. An impeller of this construction has operated successfully in processing a material within the vessel 10. Moreover, a preferred arrangement of the blades, one which is considered to provide the impeller assemblies with greater dynamic stability in operation, may be seen in FIG. 9. Referring to that Figure, a shaft 30b supports a pair of hubs 60a, 62a within a region 58. The hub 60a supports a pair of blades 64a, 66a which are directed from the hub in opposite directions, while a pair of blades 68a, 70a, also directed in opposite directions, are carried by hub 62a. Each blade of each hub is offset in the axial direction of shaft 30b toward the other hub so that the tips of all blades locate to a common circular path of movement.

Figure 9:
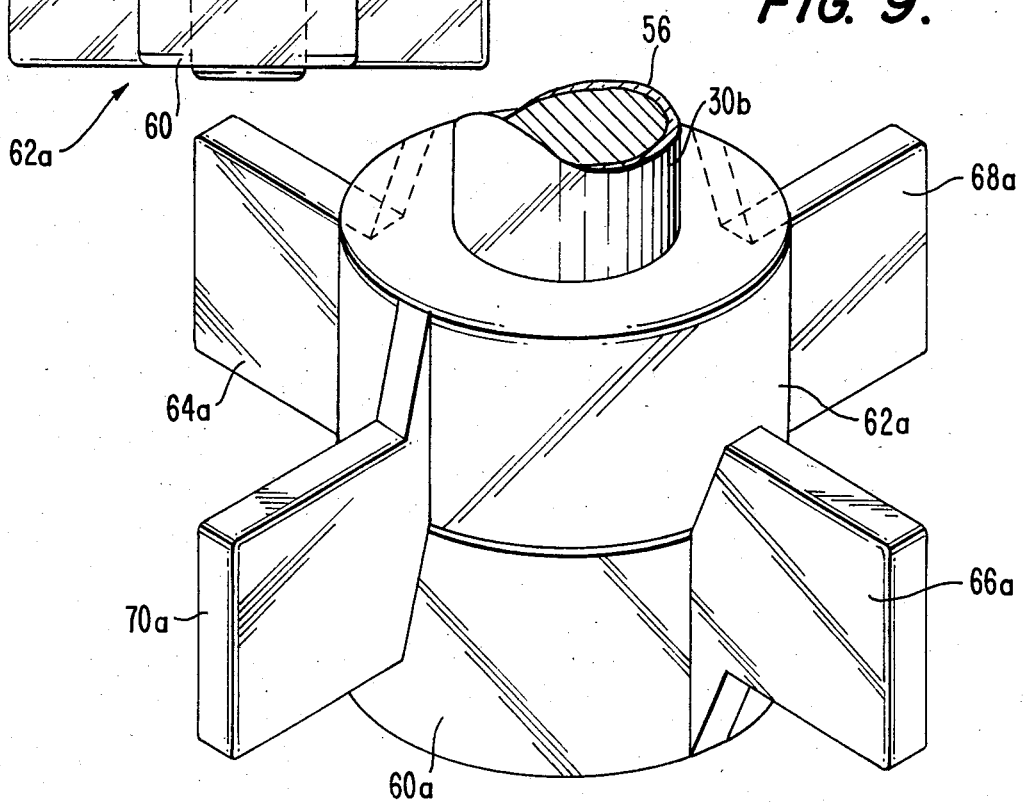
FIG. 9 is a partial perspective view, somewhat enlarged, of an impeller assembly substantially as shown in FIG. 4 with, however, the blades offset to follow a single rotational path.

Referring to both forms of the invention illustrated in FIGS. 3 and 4, as well as the modification of the impeller assembly of FIG. 9, the shaft and impeller assembly are coated throughout their entire surface area with a coating of glass having a thickness as mentioned above. The impeller assembly of these Figures is received on a shaft by cooperating tapered surfaces, wherein the taper is at a sufficiently low angle to provide a self-locking fit. The angle of taper of region 58 (FIG. 4), or the taper within socket 50 (FIG. 3), is not important, other than providing the requirement of a self-locking fit. A typical angle of taper may be about 0.6 inches on diameter for each 12 inches of length. Quite obviously, when considering the form of invention of FIG. 4, the hubs 60, 62 will be tapered along their respective bores to move into a self-locking fit along the region 58. Thus, the hub 62 necessarily will be received on the shaft before the hub 60. The particular order of receipt may be marked to avoid any possibility of assembling the component parts in an improper order. Likewise, the hubs may be marked to assure proper relative orientation between them.

The angle of taper is one of several criteria to be considered in the assembly of a separable blade agitator, thereby to assure an adequate transmission of torque between the shaft and the impeller assembly. Other factors of concern are the total surface area of contact between the shaft and impeller assembly, the force of assembly of the components, and the surface characteristics of the components to be assembled.

As indicated, the particular angle of taper other than providing an angle of taper to create a self-locking assembly is not critical. The representative construction, above, may provide a radial taper of about 1.4°± a tolerance factor. Referring to the form of the invention of FIG. 4, the region 58 may be of a length of about 8 inches, the hubs 60, 62 may each be about 4 inches overall in thickness, with about 3 inches of said thickness containing the toleranced, tapered bore, and the shaft may taper from a diameter of about 3.6 inches at the point of region 58 furthest removed from the end. An area of contact of about 33 in.$^2$ may be provided between each hub and the surface of the shaft. A good interference fit may be provided between the components by application of force thereby to transmit necessary torque to an impeller assembly having a plurality of blades extending outwardly of the hub through a distance of about 1 to about 5 feet. An impeller may include at least one hub, each providing at least one blade and a shaft may support a single tier or multiple tiers of impeller assemblies. While blades 64, 66, 68 and 70 are illustrated in FIG. 4 as extending outward of the respective mounting hubs 60 and 62. The blades could equally as well take the configuration of the blades of the form of invention illustrated in FIG. 2.

Referring to FIG. 4, the hubs are each pulled onto the tapered region of the shaft with a force which is sufficient to expand the hub and produce an interference fit between members.

With the above-described construction at ambient conditions, about 0.04 to 0.05 inch-lbs of torque may be transmitted per lb. of axial assembly force per square inch of taper contact area, prior to the joint slipping. If greater torque-transmitting capability is required, it is possible to increase the length of the tapered joint, increase the nominal diameter of the tapered joint, increase the axial assembly force, or adopt any combination of these changes to affect the required torque transmission.

According to FIG. 3, a clamp set (not shown) may be used both for assembly and disassembly of the members. Particularly, the shaft clamp may be in the form of a member of two parts, which are mounted on ridge 46, or a correspondingly positioned groove on shaft 30. Two other clamps may be mounted on blades 36 of impeller assembly 32. The shaft clamp and blade clamps may be connected with push-pull mechanisms, such as threaded rods or hydraulic cylinders. The exertion of a pulling force will act to expand the sleeve 50 in creating an interference fit between the shaft and impeller. A similar type of mechanism may provide the pulling force in assembly of shaft 30a and impeller assembly 32a of FIG. 4. To this end, a ridge 46 or a correspondingly positioned groove is located on shaft 30a. A reversal of operation, that is, the generation of a pushing force, will release the impeller assembly from the interference fit.

I claim:

1. A method of connecting a shaft and at least a first and second impeller assembly, each of which are coated with a coating of corrosion resistant material throughout their entire exposed surfaces, through an interference fitted connection between coatings comprising providing a first region at one end of said shaft and at least a second region along said shaft, spaced from said first region, said first region of said shaft extending from said one end and both regions formed by a constant tapered surface, providing a tapered surface along a bore of a hub member of each impeller assembly which is complementary to at least a portion of the length of respective surfaces within said regions along said shaft, locating said tapered surfaces along a common axis, inserting said shaft end into said bore of a second impeller assembly, moving said shaft and impeller assembly in relative movement under an applied force, to locate said second impeller assembly in interference fitted connection within said second region and, then, inserting said shaft into said bore of said first impeller assembly and moving said shaft and impeller assembly in relative movement, also under an applied force, to locate said first impeller assembly in interference fitted connection within said first region.

* * * * *